(12) United States Patent
Koppal et al.

(10) Patent No.: US 11,867,500 B2
(45) Date of Patent: *Jan. 9, 2024

(54) TIME-OF-FLIGHT (TOF) ASSISTED STRUCTURED LIGHT IMAGING

(71) Applicant: TEXAS INSTRUMENTS INCORPORATED, Dallas, TX (US)

(72) Inventors: Sanjeev Jagannatha Koppal, Gainesville, FL (US); Vikram Vijayanbabu Appia, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 514 days.

This patent is subject to a terminal disclaimer.

(21) Appl. No.: 16/920,832

(22) Filed: Jul. 6, 2020

(65) Prior Publication Data

US 2020/0333467 A1   Oct. 22, 2020

Related U.S. Application Data

(63) Continuation of application No. 16/039,114, filed on Jul. 18, 2018, now Pat. No. 10,739,463, which is a continuation of application No. 14/478,858, filed on Sep. 5, 2014, now Pat. No. 10,061,028.

(60) Provisional application No. 61/874,042, filed on Sep. 5, 2013.

(51) Int. Cl.
*G01B 11/25* (2006.01)
*G01S 17/46* (2006.01)
*G01S 17/894* (2020.01)

(52) U.S. Cl.
CPC .......... *G01B 11/2527* (2013.01); *G01S 17/46* (2013.01); *G01S 17/894* (2020.01)

(58) Field of Classification Search
CPC .... G01B 11/2527; G01S 17/894; G01S 17/46
See application file for complete search history.

(56) References Cited

U.S. PATENT DOCUMENTS

| 10,061,028 B2 * | 8/2018 | Koppal | G01B 11/2527 |
| 10,739,463 B2 * | 8/2020 | Koppal | G01B 11/2527 |
| 2015/0286340 A1 * | 10/2015 | Send | G01S 17/46 250/206.1 |

OTHER PUBLICATIONS

Anderson, Robert, Björn Stenger, and Roberto Cipolla. "Augmenting depth camera output using photometric stereo." MVA 1 (2011). (Year: 2011).*

(Continued)

*Primary Examiner* — Luke D Ratcliffe
(74) *Attorney, Agent, or Firm* — Carl G. Peterson; Frank D. Cimino

(57) ABSTRACT

A method for computing a depth map of a scene in a structured light imaging system including a time-of-flight (TOF) sensor and a projector is provided that includes capturing a plurality of high frequency phase-shifted structured light images of the scene using a camera in the structured light imaging system, generating, concurrently with the capturing of the plurality of high frequency phase-shifted structured light images, a time-of-flight (TOF) depth image of the scene using the TOF sensor, and computing the depth map from the plurality of high frequency phase-shifted structured light images wherein the TOF depth image is used for phase unwrapping.

16 Claims, 10 Drawing Sheets

(56) References Cited

OTHER PUBLICATIONS

Nicholas Ayache and Francis Lustman, "Trinocular Stereo Vision for Robotics", IEEE Transactions on Pattern Analysis and Machine Intelligence, vol. 13, No. 1, Jan. 1991, pp. 73-85.

Victor Castaneda et al., "Stereo Time-of-Flight", 2011 International Conference on Computer Vision, Nov. 6-13, 2013, Barcelona, Spain, pp. 1-8.

Daesik Kim and Sukhan Lee, "Advances in 3D Camera: Time-of-Flight vs. Active Triangulation", Intelligent Autonomous Systems 12, vol. 1, Proceedings of the 12th International Conference on Intelligent Autonomous Systems, Jun. 26-29, 2012, Jeu Island, Korea, pp. 301-309.

Bernhard Buttgen et al., "CCD/CMOS Lock-In Pixel for Range Imaging: Challenges, Limitations and State-of-the-Art", Proceedings of 1st Range Imaging Research Day, Sep. 8-9, 2005, Zurich, Switzerland, pp. 21-32.

Brian Curless and Marc Levoy, "Better Optical Triangulation through Spacetime Analysis", Proceedings of the Fifth International Conference on Computer Vision, Jun. 1995, pp. 987-994.

"Ellipse", Wikipedia, pp. 1-22, available at http://en.wikipedia.org/w/index.php?title=Ellipse&oldid=618507758 on Jul. 26, 2014.

Rahul Nair et al., "A Survey on Time-of-Flight Stereo Fusion", Time-of-Flight and Depth Imaging, Sensors, Algorithms, and Applications, Lecture Notes in Computer Science, vol. 8200, 2013, pp. 105-127.

Richard A. Newcombe et al., "KinectFusion: Real-Time Dense Surface Mapping and Tracking", IEEE International Symposium on Mixed and Augmented Reality, Basel, Switzerland, Oct. 26-29, 2011, pp. 127-136.

Uwe Hahne and Marc Alexa, "Combining Time-Of-Flight Depth and Stereo Images without Accurate Extrinsic Calibration", International Journal of Intelligent Systems Technologies and Applications, vol. 5, Nos. 3/4, 2008, pp. 325-333.

Carla Dal Mutto et al., "Locally Consistent ToF and Stereo Data Fusion", Proceedings of the 12th International Conference on Computer Vision, vol. Part I, 2012, pp. 598-607.

Chad English et al., "TriDAR: A Hybrid Sensor for Exploiting the Complementary Nature of Triangulation and LIDAR Technologies", Proceedings of the 8th International Symposium on Artificial Intelligence, Robotics and Automation in Space, Munich, Germany, Sep. 2005, pp. 1-9.

Mohit Gupta and Shree K. Nayar, "Micro Phase Shifting", IEEE Conference on Computer Vision and Pattern Recognition, Jun. 16-21, 2012, Providence, Rhode Island, pp. 813-820.

R. N. Chiou et al., The Optimal Camera Geometry and Performance Analysis of a Trinocular Vision System, IEEE Transactions on Systems, Man, and Cybernetics, vol. 25, No. 8, Aug. 1995, pp. 1207-1220.

Yongchang Wang et al., "Period Coded Phase Shifting Strategy for Real-Time 3-D Structured Light Illumination", IEEE Transactions on Image Processing, vol. 20, No. 11, Nov. 2011, pp. 3001-3013.

Ricardo R. Garcia and Avideh Zakhor, "Consistent Stereo-Assisted Absolute Phase Unwrapping Methods for Structured Light Systems", IEEE Journal of Selected Topics in Signal Processing, vol. 6, No. 5, Sep. 2012, pp. 411-424.

"Trilateration", Wikipedia, pp. 1-4, available at http://en.wikipedia.org/w/index.php?title=Trilateration&oldid=616761642 on Jul. 13, 2014.

H.O. Saldner and J. M. Huntley, "Temporal Phase Unwrapping: Application to Surface Profiling of Discontinuous Objects", Applied Optics, vol. 36, No. 13, May 1997, pp. 2770-2775.

Thomas J. Flynn, "Two-Dimensional Phase Unwrapping with Minimum Weighted Discontinuity", Journal of the Optical Society of America, vol. 14, No. 10, Oct. 1997, pp. 2692-2701.

Jeroen Van Baar et al., "Sensor Fusion for Depth Estimation, including TOF and Thermal Sensors", 2012 Second Joint International Conference on 3D Imaging, Modeling, Processing, Visualization & Transmission, Oct. 13-15, 2012, Zurich, Switzerland, pp. 472-478.

Jiejie Zhu et al., "Reliability Fusion of Time-of-Flight Depth and Stereo Geometry for High Quality Depth Maps", IEEE Transactions on Pattern Analysis and Machine Intelligence, vol. 33, No. 7, Jul. 2011, pp. 1400-1414.

P. M. Will and K. S. Pennington, "Grid Coding: A Preprocessing Technique for Robot and Machine Vision", Proceedings of the 2nd International Joint Conference on Artificial Intelligence, 1971, pp. 66-70.

Joaquim Salvi et al., "Pattern Codification Strategies in Structured Light Systems", Pattern Recognition, vol. 37, Issue 4, Apr. 2004, pp. 827-849.

Andreas Velten et al., "Femto-Photography: Capturing and Visualizing the Propagation on Light", ACM Transactions on Graphics—SIGGRAPH 2013 Conference Proceedings, vol. 32, Issue 4, Article No. 44, Jul. 2013, Anaheim, California, pp. 1-8.

Katrin Pirker et al., "An Omnidirectional Time-of-Flight Camera and its Application to Indoor SLAM", 2010 11th International Conference on Control Automation Robotics & Vision, Dec. 7-10, 2010, Singapore, pp. 988-993.

Song Zhang and Peisen S. Huang, "Novel Method for Structured Light System Calibration", Optical Engineering, vol. 45, No. 8, Aug. 2006, pp. 083601-1-083601-8.

Zhengyou Zhang, "A Flexible New Technique for Camera Calibration", IEEE Transactions on Pattern Analysis and Machine Intelligence, vol. 22, No. 11, Nov. 2000, pp. 1330-1334.

Yongchang Wang, "Novel Approaches in Structured Light Illumination", University of Kentucky Doctoral Dissertations, Paper 116, Apr. 28, 2010, pp. 1-200.

Anderson, et al., "Augmenting Depth Camera Output Using Photometric Stereo"; MVA 1; 2011; 4 pages.

Casteneda, et al.; "Time-of-flight and Kinect Imaging"; Kinect Programming for Computer Vision; Summer Term 2011-Jan. 6, 2011; 53 pages.

\* cited by examiner

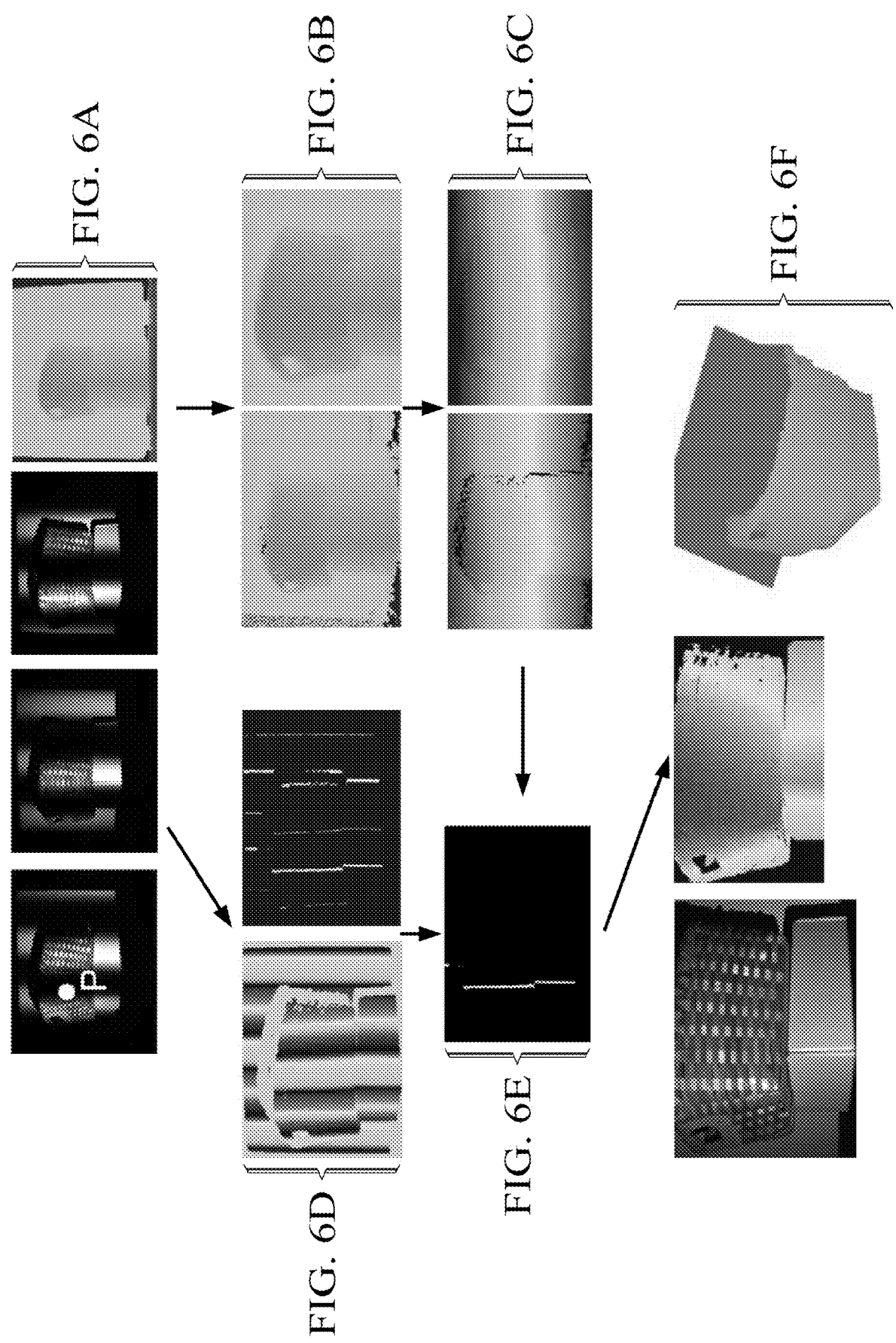

TIME-OF-FLIGHT (TOF) ASSISTED STRUCTURED LIGHT IMAGING

CROSS-REFERENCE TO RELATED APPLICATIONS

This application is a continuation of U.S. patent application Ser. No. 16/039,114 filed Jul. 18, 2018, which is a continuation of U.S. patent application Ser. No. 14/478,858, filed Sep. 5, 2014 (now U.S. Pat. No.10,061,028), which application claims priority to and the benefit of U.S. Provisional patent Application No. 61/874,042, filed Sep. 5, 2013, all of which are incorporated herein by reference in their entirety.

BACKGROUND OF THE INVENTION

Field of the Invention

Embodiments of the present invention generally relate to time-of-flight assisted structured light imaging.

Description of the Related Art

Time-of-flight (TOF) depth sensors are widely used in commercial applications due to their ability to reconstruct dynamic scenes in real-time. In general, TOF sensors work by illuminating the scene with an infrared (IR) light-emitting diode (LED) that is modulated by a continuous, periodic signal. Imaging hardware in the sensor provides pixel-level phase estimation of the reflected and scattered illumination in real-time. However, the depth measurements from these sensors tend to have inherent structural noise that may not be eliminated using image processing techniques.

On the other hand, geometric triangulation based depth techniques such as phase shifting structured light imaging are well known for their accuracy in depth calculations. In phase shifting structured light imaging, the higher accuracy in dynamic scenes is achieved by capturing multiple images of a phase shifted projected pattern. Although such structured light imaging produces much more accurate depth maps, such systems are typically not suitable for real-time depth imaging due to the multiple image capture.

SUMMARY

Embodiments of the present invention relate to methods, apparatus, and computer readable media for time-of-flight assisted structured light imaging. In one aspect, a method for computing a depth map of a scene in a structured light imaging system including a time-of-flight (TOF) sensor and a projector is provided that includes capturing a plurality of high frequency phase-shifted structured light images of the scene using a camera in the structured light imaging system, generating, concurrently with the capturing of the plurality of high frequency phase-shifted structured light images, a time-of-flight (TOF) depth image of the scene using the TOF sensor, and computing the depth map from the plurality of high frequency phase-shifted structured light images wherein the TOF depth image is used for phase unwrapping.

In one aspect, a structured light imaging system is provided that includes a projector and a time-of-flight (TOF) sensor, wherein the structured light imaging system is configured to compute a depth map of a scene by performing a method that includes capturing a plurality of high frequency phase-shifted structured light images of the scene using a camera in the structured light imaging system, generating, concurrently with the capturing of the plurality of high frequency phase-shifted structured light images, a time-of-flight (TOF) depth image of the scene using the TOF sensor, and computing the depth map from the plurality of high frequency phase-shifted structured light images wherein the TOF depth image is used for phase unwrapping.

In one aspect, a non-transitory computer readable medium storing software instructions is provided. The software instructions, when executed by at least one processor in a structured light imaging system including a time-of-flight (TOF) sensor and a projector, cause execution of a method for computing a depth map of a scene that includes capturing a plurality of high frequency phase-shifted structured light images of the scene using a camera in the structured light imaging system, generating, concurrently with the capturing of the plurality of high frequency phase-shifted structured light images, a time-of-flight (TOF) depth image of the scene using the TOF sensor, and computing the depth map from the plurality of high frequency phase-shifted structured light images wherein the TOF depth image is used for phase unwrapping.

BRIEF DESCRIPTION OF THE DRAWINGS

Particular embodiments in accordance with the invention will now be described, by way of example only, and with reference to the accompanying drawings:

FIGS. 6A-6F, 7A-7F, 8A, 8B, 9A-9D, and 10A-10D are examples;

DETAILED DESCRIPTION OF EMBODIMENTS OF THE INVENTION

Figure 1A:
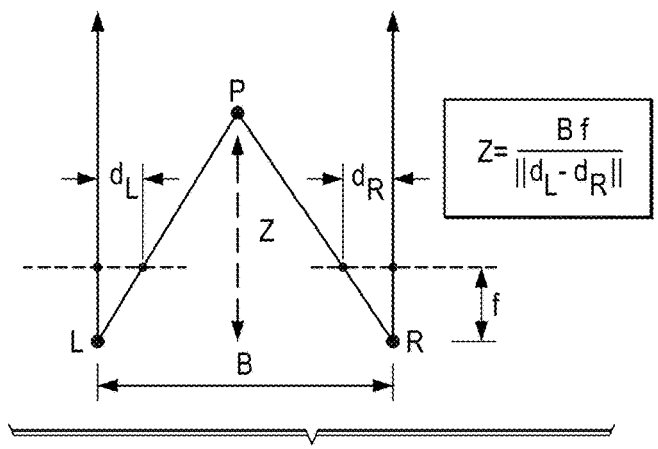
FIGS. 1A-1F are examples illustrating complementary errors in a triangulation-based depth system and a time-of-flight (TOF) depth system.

Specific embodiments of the invention will now be described in detail with reference to the accompanying figures. Like elements in the various figures are denoted by like reference numerals for consistency.

Embodiments of the invention provide for time-of-flight (TOF) assisted structured light imaging. Further, embodiments combine the real time depth capture capability of a TOF sensor with the high accuracy of phase shifting structured light systems such that obtaining high-precision depth maps in real time is possible. In some embodiments, a trinocular system includes a projector and camera for phase shifting structured light imaging and a TOF sensor for capturing a TOF depth image. In some embodiments, a novel depth sensor is provided that provides the TOF assisted structured light imaging without the need for a separate camera to capture the pattern images. The depth sensor includes a TOF sensor and a projector. The projector projects the phase shifted structured light patterns and the imager (camera) of the TOF sensor is used to capture the pattern images.

Previous research has considered the complementary advantages of TOF depth sensors and triangulation-based depth sensors. Example of such research may be found in J.

Zhu, et al., "Reliability Fusion of Time-of-Flight Depth and Stereo for High Quality Depth Maps," IEEE Transactions on Pattern Analysis and Machine Intelligence, Vol. 33, Issue 7, July 2011, pp. 1400-1414, D. Kim and S. Lee, "Advances in 3D Camera: Time-of-Flight vs. Active Triangulation," Proceedings of the 12th International Conference on Intelligent Autonomous Systems, Vol. 1, June 26-29, 2012, pp. 301-309, C. Mutto, et al., "Locally Consistent TOF and Stereo Data Fusion," Proceedings of the 12$^{th}$ International Conference on Computer Vision, Vol. 1, October 7-13, 2012, pp. 598-607, U. Hahne and M. Alex, "Combining Time-of-Flight Depth and Stereo Images Without Accurate Extrinsic Calibration," International Journal Intelligent Systems Technologies and Applications, Vo. 5, Nos. 3/4, 2008, pp. 325-333, and C. English, et al., "TriDAR: A Hybrid Sensor for Exploiting the Complementary Nature of Triangulation and Lidar Technologies," Proceedings of the 8$^{th}$ International Symposium on Artificial Intelligence, Robotics and Automation in Space, Sep. 5-8, 2005, pp. 1-9.

Error analysis of TOF depth sensors and triangulation-based depth sensors has, thus far, not been explored in the literature. Such an analysis has been widely accepted in computer vision for triangulation-based reconstruction and is applied herein to TOF sensing to demonstrate that there is a fundamental advantage for augmenting a triangulation-based system with a TOF device due to complementary errors in these two forms of depth sensing. FIGS. 1A-1F are examples illustrating this advantage.

FIG. 1 shows a ray diagram for a triangulation-based system. The assumption, without loss of generality, is that the design is rectified, i.e., epipolar lines of two sensors are parallel. If the triangulation system has baseline B and image plane distance f, and if a point P at depth Z produces a left-right disparity of d=$\|d_L-d_R\|$, then the well-known stereo equation is $$Z = \frac{Bf}{d}. \quad \text{Eq. 1}$$

Figure 1B:
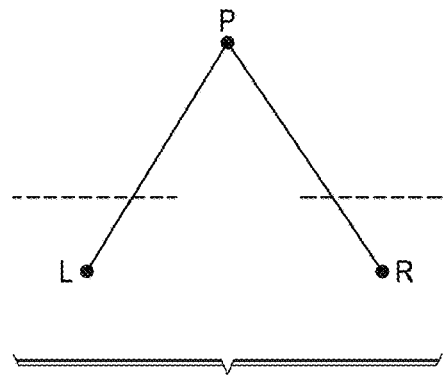

This triangulation can be obtained in the absence of noise by intersecting two rays as illustrated in FIG. 1B. In the presence of noise, there is error in the calculation of the disparity d given by $\delta d = \|e_L - e_R\|$, where $e_L$ and $e_R$ are the corresponding errors from the left and right sensors. A relationship between the depth Z and its estimation error $\delta Z$ is established by taking the derivative of Eq. 1, $$\frac{\delta d}{\delta Z} = \frac{-Bf}{Z^2}. \quad \text{Eq. 2}$$

Figure 1C:
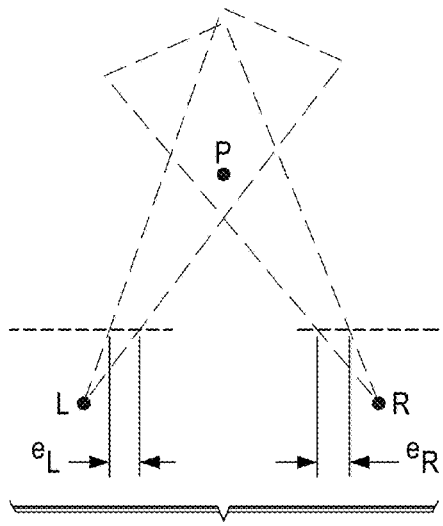

This results in an expression $$\delta Z = \frac{-\delta d Z^2}{Bf},$$

implying that the error in the measured depth $\delta Z$ increases quadratically as the depth of a point in the scene increases. This relationship, which is widely accepted, is illustrated in FIG. 1C, where the area of uncertainty in point P due to the noise is a quadrilateral whose fourth vertex (not pictured) might be present at a much greater distance than Z.

Figure 1D:
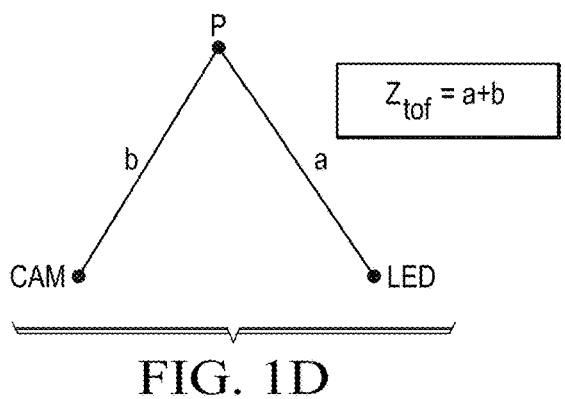

A similar analysis for TOF sensors is now presented. FIG. 1D shows a ray diagram for a general TOF system with an emitter LED and a sensor Cam. In many commercial systems, the emitter LED and the sensor Cam are co-located as close to each other as possible. This would be a special case of the ray diagram in which LED and Cam correspond to the same location in space.

The path traveled by the emitted ray is $Z_{tof}$=a+b. The distance $Z_{tof}$ is estimated by the TOF sensor by calculating the phase difference φ between the emitter LED and the receiving sensor Cam. The relationship between the two is given by $$Z_{tof} = \frac{c\varphi}{\omega} \quad \text{Eq. 3}$$

where c is the speed of light and ω is the frequency of the emitted, modulated illumination. To avoid phase wrapping discontinuities, only scenes having depth values such that there is a one to one mapping between the traversed light path $Z_{tof}$ and the phase φ are considered. In many commercial systems in which the emitter and sensor are co-located, a=b and the final, processed output of the sensor is $Z_{tof}$.

Figure 1E:
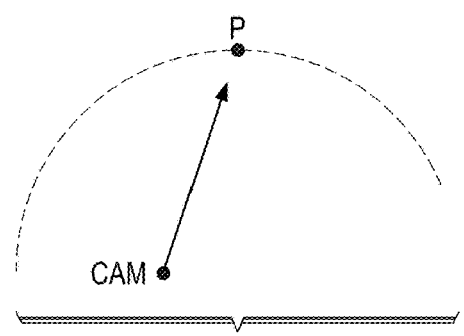

The consequence of measuring a light path (as opposed to a single ray) assuming no multi-path effects such as inter-reflections or subsurface scattering is shown in FIG. 1E. The location of the point P given the path $Z_{tof}$ traveled by light from the emitter LED to the receiving sensor Cam can be anywhere on an ellipse. This directly follows from the definition of an ellipse as the locus of points whose sum of distances to two foci is a constant value. As shown in FIG. 1, the foci are the emitter LED and the sensor Cam while the constant sum is the light path $Z_{tof}$.

In the absence of noise, this ellipsoid ambiguity is broken by the ray geometry of the sensor Cam, which is usually assumed to be a pinhole camera, and whose viewing ray for P intersects the ellipse in only one location (since the ray begins inside the ellipse) as shown in FIG. 1E. Therefore, unlike pure triangulation, the TOF sensor is designed to use a form of trilateration. In the presence of noise, errors may occur in the estimated depth due to an error in the phase δφ. The phase error δφ is illustrated geometrically in FIG. 1F as errors $e_a$ and $e_b$ in the paths a and b traversed by the light from the emitter LED. Furthermore, there may be errors in the projected ray from the sensor Cam, which is represented as a location error $e_{cam}$. This error may result, for example, from low resolution in the sensor Cam or rotation or translation errors in its relative position with respect to the emitter LED.

The estimated depth error due to an error in the phase δφ may be described by taking the derivative of Eq. 3, $$\frac{\delta\varphi}{\delta Z_{tof}} = \frac{\omega}{c} \quad \text{Eq. 4}$$

which is a constant and results in an expression $$\delta Z_{tof} = \frac{\delta\varphi c}{\omega}$$

thus implying the error in the measured depth $Z_{tof}$ of a TOF sensor does not change as the depth of a point in the scenes increases. This demonstrates a basic geometric difference between triangulation based depth imaging and TOF depth imaging.

This analysis does not mean that TOF sensors have inherently high signal-to noise ratio (SNR) as there are other structural sources of noise and error in TOF systems. For example, the analysis above assumes that "phase-wrapping" is not created by objects that are beyond the rage of the TOF sensor and that the TOF depths in a single image will be consistent. The above discussion, however, does imply that there is a geometric advantage in using TOF sensing that can complement triangulation-base sensors as the error is bounded as the point P tends to infinity.

Figure 1F:
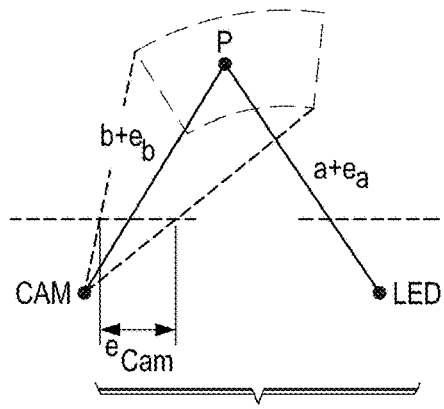

Loosely speaking, the error $\delta\varphi$ in the estimated phase difference $\varphi$ increases the width of the ellipse where the point P could lie. Of course, the entire ellipse is not being considered, just the region that lies within the viewing frustrum of the receiver Cam. This ellipsoidal fragment is shown in FIG. 1F. In this sense, using a TOF sensor can allow a triangulation system such as a phase shifting based structured light system to compensate for the well-known quadratic fall-off in depth estimation accuracy.

Figure 2:
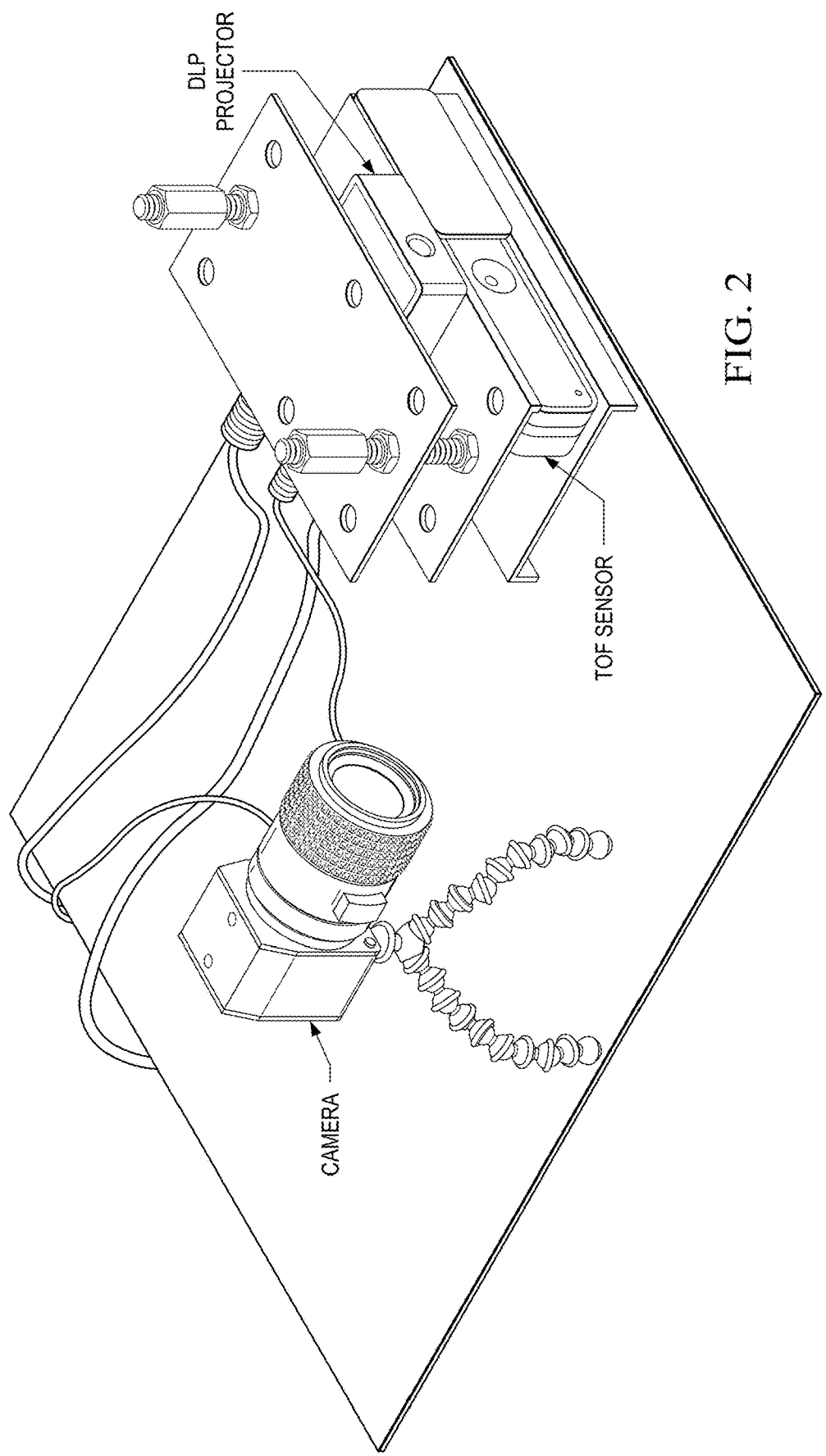
FIG. 2 shows an example trinocular system configured to perform TOF assisted structured light imaging.

FIG. 2 is an example of a trinocular structured light imaging system configured to perform TOF-assisted phase shifting structured light imaging. The imaging system includes a camera, a projector, and a TOF sensor. The camera, projector and TOF sensor are arranged in a 90 degree offset configuration as it is well known that such a configuration is a suitable configuration for trinocular systems. In this example, the camera and the projector are on a horizontal baseline and the TOF sensor and the projector are on a vertical baseline. The camera is also positioned such that the field of view of the camera overlaps that of the projector such that the camera can capture images of structured light patterns projected into a scene by the projector. One of ordinary skill in the art will understand that other variants of this configuration may be used. Further, one of ordinary skill in the art will understand embodiments in which a suitable camera, projector, and TOF sensor are housed in differing form factors. Operation of embodiments of such a trinocular structured light imaging system to perform TOF-assisted phase shifting structured light imaging is explained below in reference to the method of FIG. 4.

Figure 4:
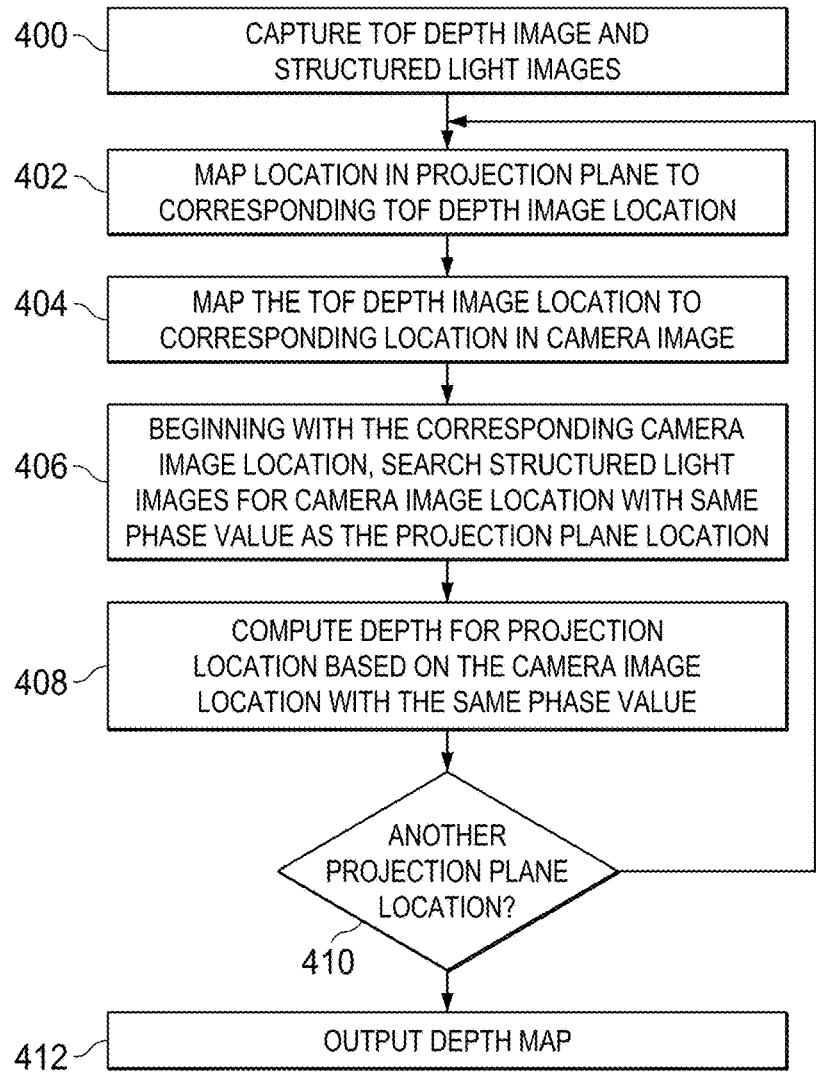
FIGS. 4 and 5 are flow diagrams of methods.

FIG. 4 is a flow diagram of a method for TOF-assisted phase shifting structured light imaging that may be performed, for example, in a trinocular structured light imaging system such as the system of FIG. 2. The method is based on TOF-aided phase unwrapping from multiple images of high frequency phase-shifted patterns projected by the projector and captured by the camera. In phase shifting structured light imaging, a sequence of shifted sinusoidal patterns encoding location information as a phase deviation is projected. In its simplest form, phase-shifting involves the projection of three low-frequency sinusoidal patterns which encode each location along the epipolar line with a unique phase.

The accuracy of phase shifting structured light imaging can be improved by using high frequency sinusoidal patterns to generate very high precision depth over a small depth range. The phase maps created using a high frequency pattern sequence encode multiple locations with the same phase along a given epipolar line, thus creating depth ambiguities. To disambiguate between these locations, the recovered phase data is unwrapped to create a single period. Several techniques have been developed to unwrap the phase in post-processing, such as, for example, the techniques described in T. J. Flynn, "Two-Dimensional Phase Unwrapping with Minimum Weighted Discontinuity," Journal of the Optical Society of America, Vol. 14, Issue 10, Oct. 1, 1997, pp. 2693-2701, and H. O. Saldner and J. M. Huntley, "Temporal Phase Unwrapping: Application to Surface Profiling of Discontinuous Objects," Applied Optics, Vol. 36, Issue 13, May 1, 1997, pp. 2770-2775. However, these techniques may not work reliably under all conditions.

Alternative techniques project a sequence of patterns at multiple frequencies on a static scene and use the lower frequency patterns as cues to unwrap the phase. Examples of such techniques are described in J. Salvi, et al., "Pattern Codification Strategies in Structured Light Systems," Pattern Recognition, Vol. 37, Issue 4, April, 2004, pp. 827-849, and Y. Wang, et al., "Period Coded Phase Shifting Strategy for Real-Time 3-d Structured Light Illumination," IEEE Transactions on Image Processing, Vol. 20, Issue 11, November, 2011, pp. 3001-3013. Such techniques, while reliable, require the capture of many pattern images for each depth map which may not be practical for real-time depth imaging of dynamic scenes.

Figure 3:
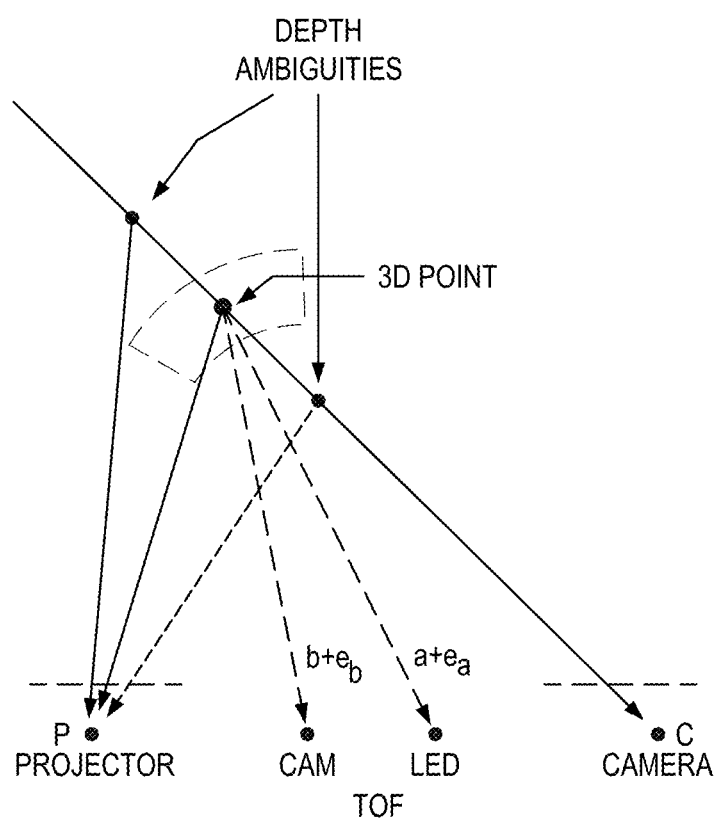
FIG. 3 is an example.

However, a depth image captured by a TOF sensor concurrently with the capture of the images of the projected pattern sequence can be used to resolve depth ambiguities and unwrap the phase of a few high frequency phase shifting patterns. This can enable fast scene depth capture with the accuracy and reliability of a multiple frequency phase shifting structured light imaging system. FIG. 3 is an example illustrating the working principle of TOF-aided phase unwrapping to remove depth ambiguities. The "shaded" area shows the error in the TOF sensor alignment. This error does not magnify the error in phase unwrapping which produces the depth ambiguities. The TOF estimate, i.e., the shaded area, may be used to break the phase unwrapping ambiguities. As previously discussed, the uncertainty in the location of a 3D point in the TOF sensor is complementary to the uncertainty cause by error in triangulation due to wrapped phases. This property allows the phase of high frequency sinusoidal patterns to be unwrapped with the assumption that a scene does not contain material that might produce corrupted TOF depth measurements and there is no TOF "phase wrapping."

Referring again to FIG. 4, the method assumes that the projector, camera, and TOF sensor are all calibrated with each other, i.e., that a calibration matrix has been pre-determined for each sensor pair: projector-camera, camera-TOF sensor, and projector-TOF sensor. The projector and camera may be calibrated using any suitable calibration technique to generate the projector-camera calibration matrix. Example of suitable techniques may be found, for example, in S. Zhang and P. S. Huang, "Novel Method for Structured Light System Calibration," Optical Engineering, Vol. 45, No. 8, pp.083 601-1-083 601-8, August, 2006, and Z. Zhang, "A Flexible New Technique for Camera Calibration," IEEE Transactions on Pattern Analysis and Machine Intelligence, Vol. 22, No. 11, pp. 1330-1334, November, 2000.

The calibration of the camera and the TOF sensor to generate the camera-TOF sensor calibration matrix may be performed as follows. Sparse correspondence points, e.g., approximately 30 correspondence points, are obtained between the image planes of the camera and the TOF sensor using a target such as a checkerboard pattern on a flat surface. An image of the target is captured by the camera and the TOF sensor and the correspondence points in each image, e.g., corners of the checkerboard pattern, are manually selected using a mouse. The TOF camera image plane is assumed to have no skew and the camera image is assumed to be at the geometric origin. The TOF projection matrix is $M_{tof}=K_{tof}[I|0]$. The focal length f (which is the only variable parameter in $K_{tof}$) is unknown. Focal length estimation is a widely known issue with TOF sensors whose outputs are range estimates along the viewing ray through the center of projection.

Given a corresponding pair of 2D points $p_{tof}$ and $p_{cam}$ in the TOF sensor image and the camera image, and the TOF depth $Z_{tof}$, a 3D point P may be obtained as follows. Assuming that the coordinates of the 2D point have been centered to the image midpoint, define the length of the ray between the point and the center of projection as $L=\sqrt{x_{tof}^2+y_{tof}^2+f^2}$ where f is the focal length and $p_{tof}=(x_{tof}, y_{tof})$. The 3D point P is then given by $$P = \left(\frac{Z_{tof} x_{tof}}{L}, \frac{Z_{tof} y_{tof}}{L}, \frac{Z_{tof} f}{L}\right).$$

The minimization for calibration then becomes $$\min_{M_{cam}} \Sigma_i \|M_{cam}{}^i P^i - p_{cam}{}^i\| \quad \text{Eq. 5}$$

where the index i ranges over the number of correspondence pairs. Given a focal length f, the camera matrix $M_{cam}$ is estimated from the eigenvector of the minimum eigenvalue of a matrix created by rearranging the above equation for each camera-TOF sensor correspondence pair. A search is performed over a reasonable range of values of the focal length f in which each estimated value of f is used to obtain the camera matrix. The matrix with the lowest error given by Eq. 5 is selected as the camera-TOF calibration matrix.

The calibration of the projector and the TOF sensor to generate the projector-TOF sensor calibration matrix may be performed in much the same way as the camera and TOF sensor calibration, using sparse correspondence points, e.g., approximately 30 correspondence points, between the planes of the projector and the TOF sensor. However, obtaining the correspondence points $p_{tof}$ and $p_{cam}$ is not straight forward as a checkerboard textured plane cannot be imaged by the projector, and the visible light projected by the projector is not visible in the TOF depth image.

Figure 5:
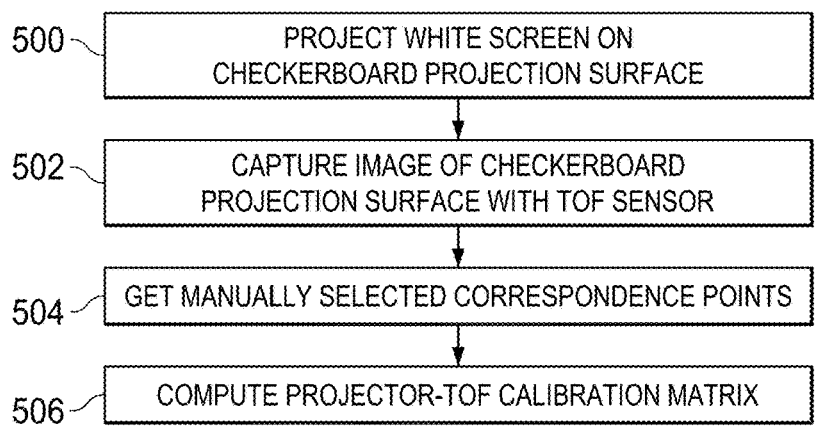

FIG. 5 is a method for projector and TOF sensor calibration that illustrates how the needed correspondence points may be established. Initially, a white screen is projected 500 by the projector in full-screen mode onto a checkerboard textured plane (checkerboard projection surface). A depth image of the checkerboard projection surface with the projected white screen is captured 502 by the TOF sensor. In addition, correspondence points, i.e., corners of the checkerboard pattern, are manually selected 504 on the projection surface. The corner locations and the associated depth values are read from the TOF depth image. Once the correspondence points and the depth values are obtained, the process described above for camera/TOF sensor calibration may be used to compute 506 the projector-TOF sensor calibration matrix.

Referring again to FIG. 4, initially a TOF depth image and some number of high frequency phase-shifted structured light images of the scene are captured 400. For simplicity of explanation, three high frequency phase-shifted images are assumed. The number of phase-shifted images that may be captured in an embodiment may depend on the speed of the camera and the TOF sensor. The capture of the structured light images should be completed within the time needed by the TOF sensor to capture the TOF depth image.

A depth map is then computed 402-410 based the structured light images in which the TOF depth image is used in phase unwrapping, and the depth map is output 412 for further processing. In general, camera-projector location correspondences are established using the TOF depth image, and a suitable triangulation technique is applied to estimate the depth. Some suitable techniques are described, for example, in J. Salvi, et al., "Pattern Codification Strategies in Structured Light Systems," Pattern Recognition, Vol. 37, No. 4, pp 827-849, April, 2004.

More specifically, to compute the depth map, a depth value is computed for each location of the projection plane as follows. For a given location in the projection plane, the projection plane location is mapped 402 to a corresponding location in the TOF depth image. This mapping is performed using the projector-TOF calibration matrix. The corresponding TOF depth image location is then mapped 404 to a corresponding location in the camera image. This mapping is performed using the camera-TOF calibration matrix. The result of these two steps is the identification of a location in the camera image that may not exactly correspond to the projector location but is close to the actual corresponding camera image location. The identified camera image location may not exactly correspond to the projector location due to the low resolution of the TOF depth image and the higher resolutions of the projector and the camera. Due to the resolution difference, multiple projector locations may map to the same TOF depth image location, and thus to the same location in the camera image.

To find the actual camera image location corresponding to the projector location, the structured light images are searched in a small neighborhood around the identified camera image location to find the image location with the same phase value as the projector location. The search is performed along a vertical or horizontal line, depending on the baseline of the camera and the projector. A phase value is computed for a candidate location in the search neighborhood, and compared to the phase value of the projector location. The search is terminated when a camera image location is found with the same phase value as the projector location. In some embodiments, the phase value of a candidate camera image location (x, y) is computed as $$\text{phase}(x,y) = \text{atan}((I0(x,y) - I2(x,y))/(I1(x,y) - I2(x,y)))$$

where I0, I1, and I2 are the three structured light images. This is a well-known approach and is described in more detail in Y. Wang, "Novel Approaches in Structured Light Illumination," University of Kentucky Doctoral Dissertations, Paper 116, pp. 1-183, 2010, available at http://uknowledge.uky.edu/gradschool_diss/116.

Note that the phase values of the locations of the projector plane can be computed from the projected high frequency phase-shifted patterns and are computed in the same way as the phase values computed from the structured light images. The phase values of the projector plane locations may be computed one time and stored for use in the method.

Once the actual camera image location corresponding to the projection location is identified, a depth value is computed 408 for the projection location based on the corresponding camera image location.

FIGS. 6A-6F are an example illustrating the overall TOF-assisted depth map computation at a high level. FIG. 6A shows three example high frequency phase-shifted structured light images of a scene and a corresponding TOF depth image. The leftmost image of FIG. 6F is an image of the scene. The three structured light images are not sufficient to establish the needed projector-camera correspondence and cause ambiguities as illustrated in the phase maps of FIG. 6D. The rightmost phase map of FIG. 6D illustrates the ambiguities for point P in FIG. 6A. A mapping between projector plane locations and camera image locations for the given scene is created by warping the TOF depth image to the camera image and the projector plane. The warped TOF depth images are shown in FIG. 6B and the camera-projector correspondence mapping is illustrated in FIG. 6C, where corresponding points have the same shading. This mapping of locations in the camera image and projector plane through the TOF depth image reduces the search range for phase correspondence. If the period of the high frequency phase-shifting pattern used is sufficiently large to accommodate less than one period within the region of ambiguity created by the TOF depth image, each camera image location will have a unique correspondence to a line stripe, as illustrated in FIG. 6E.

FIG. 6F shows, from left to right, an image of the scene, the depth map computed from the structured light images of the scene shown in FIG. 6A, and the depth map rendered in 3D as a point cloud. Note that this depth map is a high-resolution depth map showing subtle details of the scene that are lost due to noise in the TOF depth image (see FIG. 6A). For example, as can be seen in FIG. 6F, the details of the wicker pattern on the basket are visible in the depth map while these details are completely lost in the TOF depth image (see FIG. 6A). There are some artifacts along the top edge of the basket in the depth map. These artifacts are present because certain regions visible in the TOF depth map are not visible in the camera images.

Experiments were performed to test the efficacy of the above method for generating a depth map. Some of the experiments compared the depth map resulting from the method to a depth map using a TOF sensor alone and a depth map using low-frequency phase shifting structured light imaging. For these experiments, a VGA (640×480) resolution DLP pico projector, a QVGA (320×240) resolution TOF depth sensor, and a 1.2 megapixel (1280×960) Point Grey camera were used. For the TOF-aided phase shifting method, three high frequency phase-shifted structured light images of the scene and a TOF depth image of the scene were simultaneously captured. The same frame rate was used to capture the images for the TOF-aided method, the TOF depth map, and the images for the low-frequency phase shifting structured light depth map.

Figure 7A:
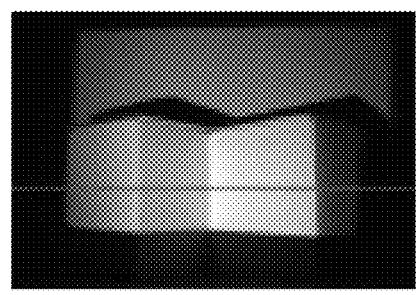
Figure 7B:
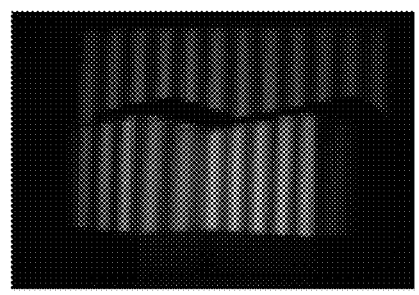
Figure 7C:
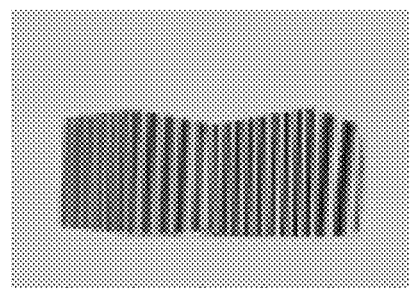
Figure 7D:
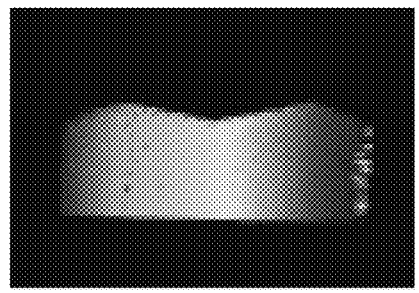
Figure 7E:
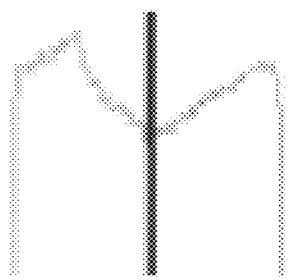
Figure 7F:
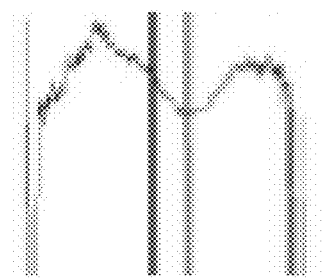

FIGS. 7A-7F are an example showing the depth results for a V-groove. FIG. 7A is an image of the scene and FIG. 7B shows one of the three captured structured light images. FIG. 7C shows the wrapped decoded phase map and FIG. 7D shows the unwrapped (disambiguated) phase map after applying the TOF-assisted phase unwrapping of the method. The 1D (one dimensional) profile for the groove depth result from the method and the depth generated using low-frequency phase shifting are shown in FIGS. 7E and 7F, respectively. As is illustrated, the location of the groove is incorrect in the low-frequency phase shifting pattern case due to global illumination while the groove location is correct when the method is used. This is due to the use of only high frequency illumination, which is resistant to the effects of global illumination.

Figure 8A:
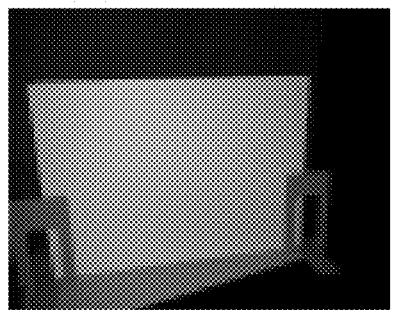
Figure 8B:
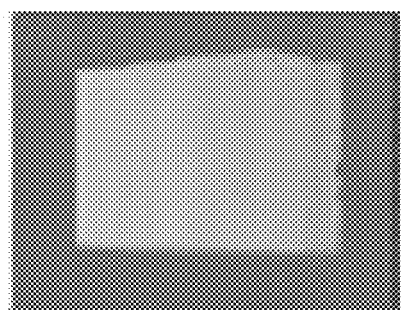

An inclined flat surface as shown in FIG. 8A was also imaged and the resulting depth map generated by the method is shown in FIG. 8B. A plane was fit on the resulting depth image to approximate the flat object. The normalized standard deviation for the measured surface from the approximated plane was estimated for the TOF-assisted phase shifting method, the low-frequency phase shifting, and the TOF depth image. Results shown in Table 1 below suggest that the high frequency patterns used in TOF-assisted phase shifting method produce a more accurate result than the other methods.

TABLE 1

| Method | TOF-assisted Structured Light | Low-freq. Phase shifting | TOF depth |
| --- | --- | --- | --- |
| Normalized Std. Deviation | 0.060 | 0.146 | 0.3881 |

Figure 9A:
Figure 9B:
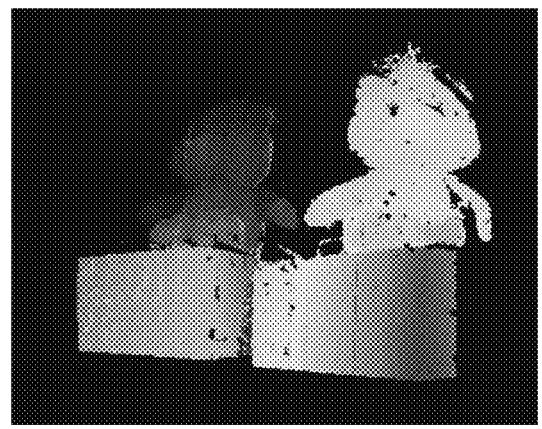
Figure 9C:
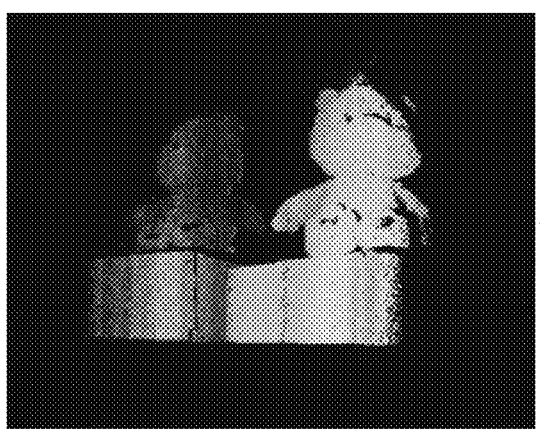
Figure 9D:
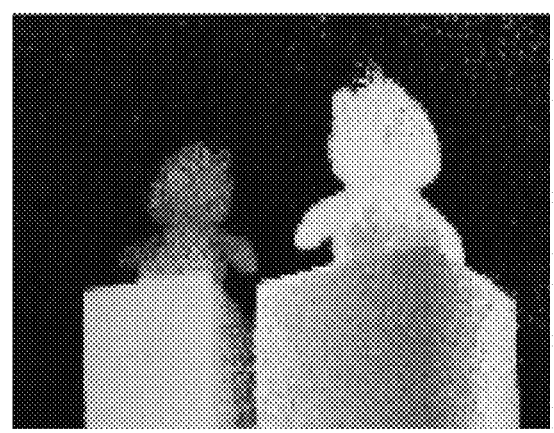
Figure 10A:
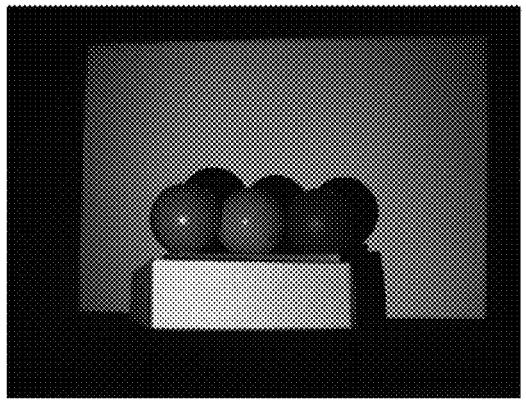
Figure 10B:
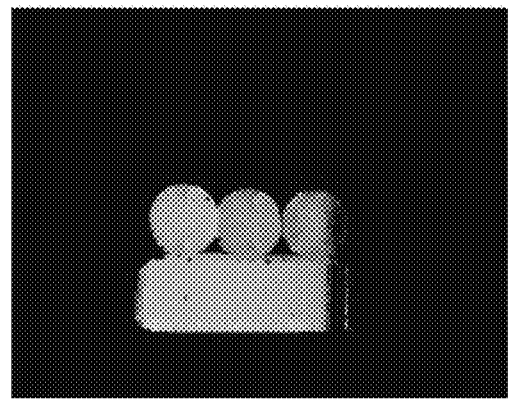
Figure 10C:
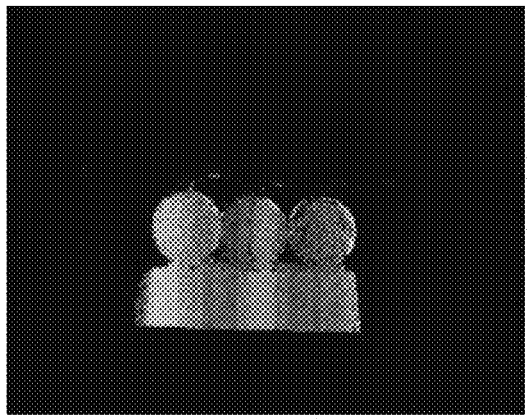
Figure 10D:
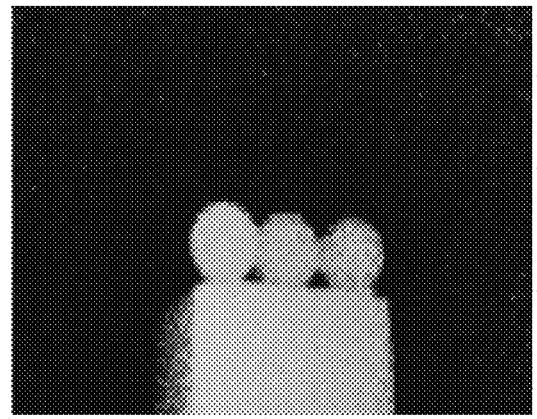

FIGS. 9A-9D and FIGS. 10A-10D shows comparisons of depth maps for different scenes with real-life objects having textured surfaces and subtle depth variations. FIGS. 9A and 10A show the original scenes. FIGS. 9B and 10B show the depth maps resulting from the TOF-assisted method described herein. FIGS. 9C and 10C show the depth maps resulting from low-frequency phase shifting structured light imaging. FIGS. 9D and 10D show the TOF depth maps. As these example show, the TOF-assisted method yields high-resolution, accurate, and dense depth maps as compared to the depth maps from the other two methods.

Figure 11:
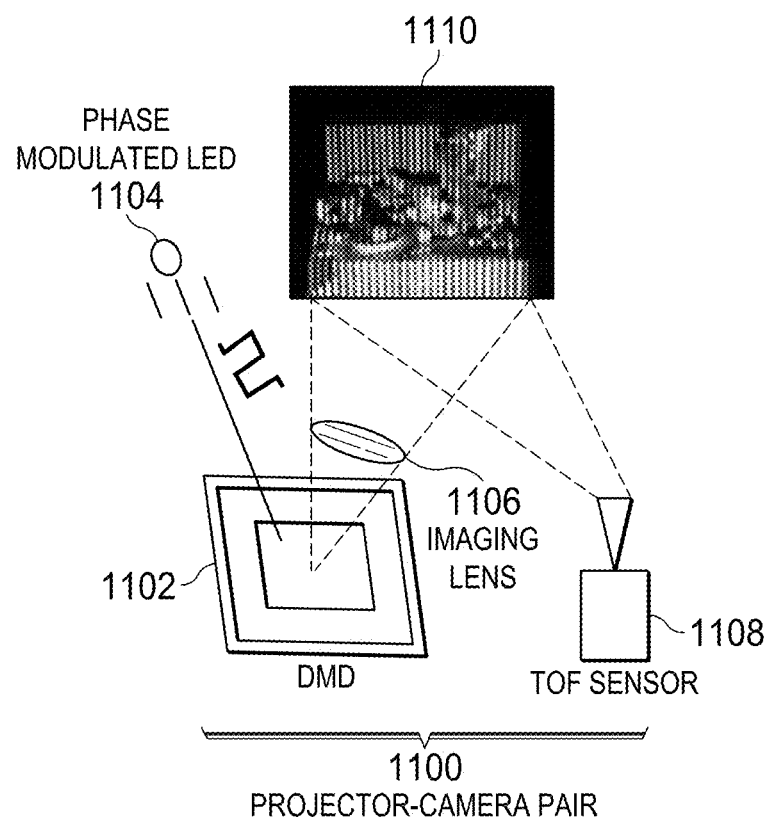
FIG. 11 shows an example TOF-structured light depth sensor configured to perform TOF assisted structured light imaging.

FIG. 11 shows an example TOF-structured light depth sensor 1100 (structured light imaging system) configured to capture the images needed for TOF assisted structured light imaging as described herein. The illustrated depth sensor combines the benefits of a TOF sensor with a phase shifting structured light imaging system to allow generation of accurate depth maps in real time, i.e., at the high frame rates of a TOF sensor. The depth sensor 1100 includes a DMD (digital micromirror device) array 1102 for generating and projecting the phase shifted structured light patterns and uses a phase modulated LED (light emitting diode) 1104 as the light source for the DMD array 1102. The patterns generated by the DMD mirrors are focused on the scene 1110 using an imaging lens 1106. A TOF sensor 1108 placed at an offset from the DMD array 1102 is used to capture the structured light images of the scene 1110 and the TOF depth image of the scene. Other alternatives to the DMD-based projector that may be used to create and project the structured light patterns include an LCD (liquid crystal display) based spatial light modulation system or an LCOS (liquid crystal on silicon) based spatial light modulation system.

The depth sensor 1100 may be used instead of a trinocular system such as that of FIG. 2 to capture the structured light images and TOF depth image in the method of FIG. 4. The TOF sensor 1108 is used to capture the three high frequency phase-shifted structured light images and the TOF depth image is generated from the three captured images. More specifically, each captured structured light pattern image will have depth for the bright regions of the scene at that time the image is captured. The depths from these three images are combined to generate the TOF depth image. Further, the step 404 of mapping the TOF depth image location to a camera image location is eliminated as the TOF sensor is being used as the camera as well as the TOF depth sensor.

Figure 12A:
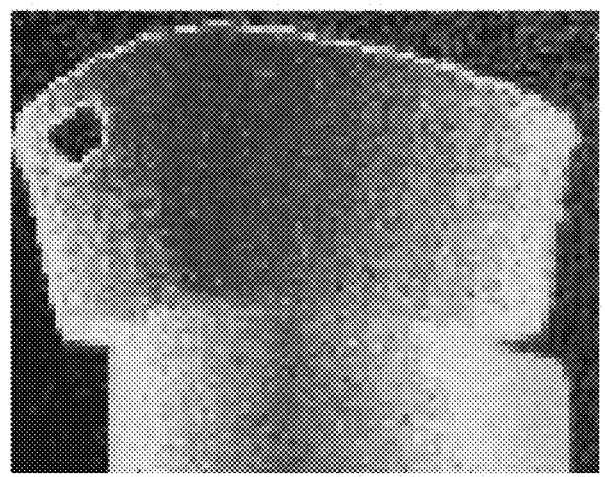
FIGS. 12A and 12B are examples.
Figure 12B:
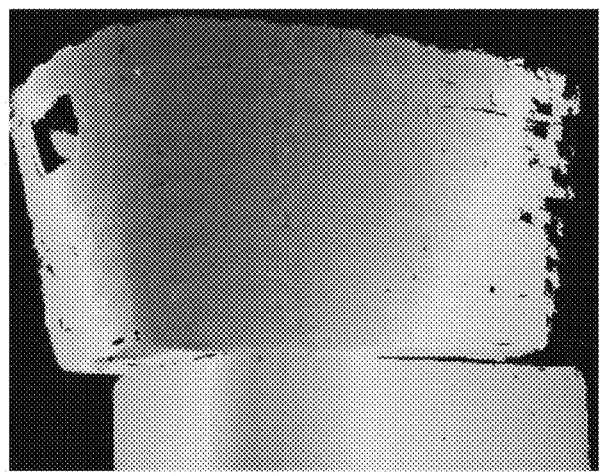

FIG. 12A shows a TOF depth map of a scene captured using a TOF sensor and FIG. 12B shows a depth map of the scene generated using the method of FIG. 4.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
identifying a first location in a time-of-flight (TOF) depth image using a projector-TOF sensor calibration matrix;
identifying a projector plane location in a camera image based on the TOF depth image by at least mapping the first location in the TOF depth image to the projector plane location using a camera-TOF sensor calibration matrix;
identifying a second location in a structured light image based on a phase value of the second location and further based on a phase value of the projector plane location; and
computing a depth value based on the second location.

2. The method of claim 1, wherein the camera image is captured by a TOF sensor.

3. The method of claim 2, wherein a projector in the projector plane location is a digital micromirror device using a phase modulated light emitting diode as a light source.

4. The method of claim 1, wherein identifying the projector plane location in the camera image comprises using the TOF depth image for phase unwrapping.

5. The method of claim 1, wherein the structured light image is a high frequency phase-shifted structure light image.

6. A structured light imaging system comprising:
a projector configured to project a plurality of phase-shifted structured light patterns; and
a time-of-flight (TOF) sensor,
wherein the structured light imaging system is configured to perform a method comprising:
identifying a first location in a time-of-flight (TOF) depth image using a projector-TOF sensor calibration matrix;
identifying a projector plane location in a camera image based on the TOF depth image by at least mapping the first location in the TOF depth image to the projector plane location using a camera-TOF sensor calibration matirx;
identifying a second location in a structured light image based on a phase value of the second location and further based on a phase value of the projector plane location; and
computing a depth value for a location of the projector based on the second location.

7. The structured light imaging system of claim 6, further comprising a TOF sensor configured to capture the camera image.

8. The structured light imaging system of claim 7, wherein the projector is a digital micromirror device using a phase modulated light emitting diode as a light source.

9. The structured light imaging system of claim 6, wherein identifying the projector plane location in the camera image comprises using the TOF depth image for phase unwrapping.

10. The structured light imaging system of claim 6, wherein the structured light image is a high frequency phase-shifted structure light image.

11. A non-transitory computer readable medium storing software instructions that, when executed by at least one processor in a structured light imaging system comprising a time-of-flight (TOF) sensor and a projector, cause execution of a method for computing a depth map of a scene, the method comprising:
identifying a first location in a time-of-flight (TOF) depth image using a projector-TOF sensor calibration matrix;
identifying a projector plane location in a camera image based on the TOF depth image by at least mapping the first location in the TOF depth image to the projector plane location using a camera-TOF sensor calibration matrix;
identifying a second location in a structured light image based on a phase value of the second location and further based on a phase value of the projector plane location; and
computing a depth value for a location of the projector based on the second location.

12. The non-transitory computer readable medium of claim 11, wherein the camera image is captured by the TOF sensor.

13. The non-transitory computer readable medium of claim 12, wherein the projector is a digital micromirror device using a phase modulated light emitting diode as a light source.

14. The non-transitory computer readable medium of claim 11, wherein identifying the projector plane location in the camera image comprises using the TOF depth image for phase unwrapping.

15. The non-transitory computer readable medium of claim 11, wherein the structured light image is a high frequency phase-shifted structure light image.

16. The non-transitory computer readable medium of claim 11, wherein the projector is configured to project a plurality of phase-shifted structured light patterns.

* * * * *